Nov. 23, 1954 W. M. SCOTT, JR 2,695,345
BLOW OPEN, BLOW CLOSED CIRCUIT BREAKER
Filed April 19, 1950 6 Sheets-Sheet 1

INVENTOR.
WILLIAM M. SCOTT, JR.
BY
Ostrolenk & Faber
Attorneys

Nov. 23, 1954  W. M. SCOTT, JR  2,695,345
BLOW OPEN, BLOW CLOSED CIRCUIT BREAKER
Filed April 19, 1950  6 Sheets—Sheet 4

INVENTOR.
William M. Scott, Jr.
BY Strolenk & Faber
Attorneys

INVENTOR.
WILLIAM M. SCOTT, JR.
BY
*Ostrolenk & Faber*
Attorneys

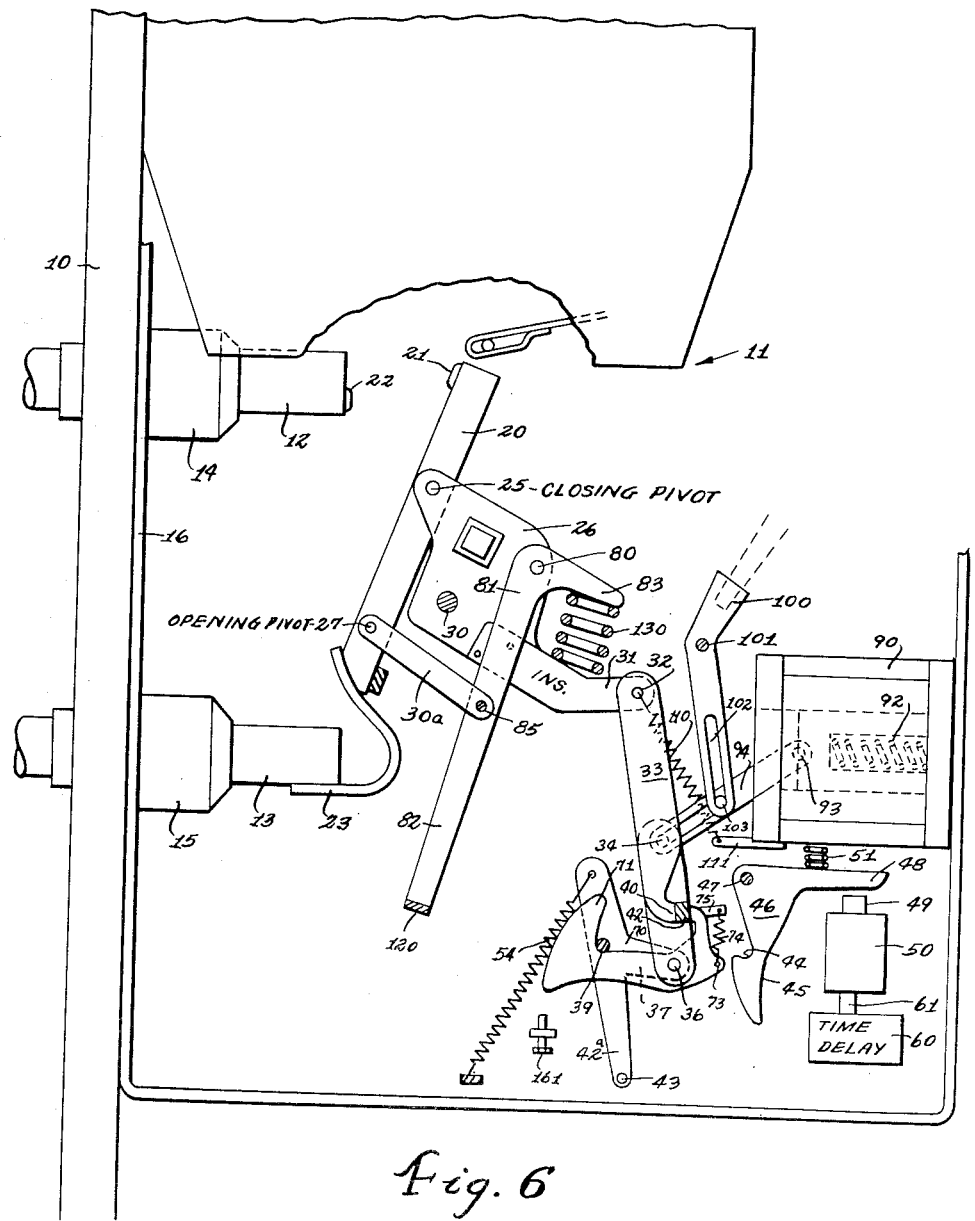

United States Patent Office 2,695,345
Patented Nov. 23, 1954

2,695,345

BLOW OPEN, BLOW CLOSED CIRCUIT BREAKER

William M. Scott, Jr., Bryn Mawr, Pa., assignor to I-T-E Circuit Breaker Company, Philadelphia, Pa., a corporation of Pennsylvania Application April 19, 1950, Serial No. 156,868

9 Claims. (Cl. 200—89)

My present application relates to circuit breakers and more particularly to circuit breakers which utilize the electromagnetic action of current in the controlled circuit for assisting in driving the circuit breaker contacts closed (called blow closed), as well as for assisting in driving the circuit breaker contacts open (called blow open).

Circuit breakers intended for application in selective tripping systems are provided with time delay trip devices for delaying the operation of the trip devices following the initiation of a fault in the circuit being protected. This time delay may be set for individual timing to enable the circuit breaker nearest the fault to open the circuit thus reducing to a minimum disruption of service by the fault. Following such an interruption to service, the operator attempts to reclose the circuit breaker to determine whether the fault was temporary or permanent. The operator may in such a case close the circuit breaker on an existing fault.

In the construction of such circuit breakers it is usually good design procedure to have the electrical circuit in the form of a U-shaped loop in which the incoming and outgoing current studs form the two sides and the movable contact is the bridging member of the U loop.

With this design, difficulties arise due to the excessively high magnetic forces which are exerted on the elements of the loop when said loop is subject to short circuit current. The stationary incoming and outgoing studs may be designed as relatively heavy members securely anchored so as to successfully resist these forces. With respect to the moving contact or bridging member which has to move both from the open to the closed position and from the closed position to the open position in the presence of these forces, great difficulty in securing proper operation has been experienced in the past.

The forces exerted on the moving contact depend upon the current flowing in the circuit and upon the length and geometry of the current path. The extremely high mechanical stress exerted in such a direction tends to increase the length of the current loop with the resultant effect of forcing the movable contact arm away from the center of the loop. Should this movable arm be pivoted on its lower end, as is usual in present designs of circuit breaker, the other end will tend to be forced away from contact with the upper stationary stud.

At present, power circuit breakers are constructed to take advantage of this force to assist the opening of the circuit breaker in the transition from the fully latched position to the open contact position in response to a fault. However, during the closing stroke following engagement of the contacts but before the contacts are latched in engagement, these forces are in opposition to the applied force used to close the circuit breaker. In this period of the closing stroke the magnetic stresses due to the fault currents will become effective as soon as these contacts prior to latching, close sufficiently to permit current flow. During the short time interval while the time delay function of the overcurrent devices is delaying the tripping operation, the operator is applying a closing force, either manually or by electrical control, against the opening forces due to short circuit currents flowing in the contact arms. This results in a hesitation in the closing movement of the movable contact against the fixed contact—the magnetic forces due to the short circuit currents tending to drive the contacts apart as the closing operation is tending to drive the contacts into firm engagement.

With sufficient magnitude of short circuit current, the magnetic forces due to these currents will exceed the force utilized in closing the circuit breaker. Under these conditions the contacts will not be allowed to approach the fully latched closed position of the circuit breaker with the proper degree of contact pressure. The two forces may reach an equilibrium condition at a point where contact engagement is effected just sufficient to allow current to flow, the contact engagement being, however, well below the high pressure engagement that is regarded as essential when the contacts are latched in engagement. The resultant high resistance contact engagement and the excessively high value of current flow causes almost instantaneous high temperature of the material at the point of contact. These temperatures are sufficient to cause melting and welding of the contact material. The ultimate result is destruction of the circuit breaker contacts.

If the blow-open force is much greater than the closing force, the contacts may be driven apart against the action of the closing force. The fault current circuit is, therefore, opened and the externally applied force again becomes operative to attempt to close the contacts. Inasmuch as the time delay will not have time to function during the short period the fault current circuit is closed, this cycle of opening and closing is repeated until the contacts are destroyed.

Accordingly, in standard practice it has heretofore been necessary to take the following compensating steps in the application of power circuit breakers because of the conditions cited above:

1. Whenever the maximum current calculated to be available from the electrical system under full fault conditions exceeds 12,000 amperes, the use of manually operated circuit breakers is prohibited because the magnetic forces due to currents above this value may be too great to allow the contacts to be latched when closed by manual operation.

2. Where electrically operated breakers are required to close the latch against fault currents and where there is a time delay deliberately introduced in the tripping operation of the overcurrent protective devices, the maximum interrupting capacity of the breaker is derated to approximately 63% of its normal interrupting rating. This derated value is necessary because the introduction of the time delay in tripping the circuit breaker will require that the contacts be given the proper amount of contact pressure if the fault current is to be allowed to flow continuously for the trip period required, no matter how short. If the closing force is unable to overcome the magnetic stresses involved in addition to the mechanical resistance of the contact pressure, the low contact wipe will cause high temperature and consequent melting of the contact material.

Without deliberate time delay in tripping, the trip free arrangement of the closing mechanism will function to disengage the contact as soon as the fault current begins to flow and consequently the fully latched position of the circuit breaker will not be required. The contact engagement under this condition is too short to allow the contacts to reach any dangerous temperatures. Therefore, with instantaneous tripping on fault currents the breaker may be applied in circuits with the full normal interrupting rating.

3. The range of control voltage over which a closing solenoid is required to operate is derated from the present standard range of closing voltage values to a range which will permit a greater closing effort to be applied at the minimum extreme of the range. At the maximum extreme of the normal range, however, this closing force is correspondingly increased but the voltage and the latching efficiency and mechanical stability of the closing mechanism parts may be jeopardized if this relatively high closing voltage value is adhered to. Therefore, under this condition it is customary to lower the maximum value at which the circuit breaker must be tested and still maintain proper closing condition. For example, a 125 volts D. C. closing mechanism is normally expected to close the breaker within the range of 90 volts to 140 volts at the closing solenoid terminals. A circuit breaker which will barely close on the minimum value of this range will tend to slam on the maximum. At the latter value, there is a great danger of breakage to the closing mechanism parts especially when closing against a low value of the power current in the circuit breaker contacts. If the closing force at 90 volts is increased by means of a new coil design to be able to close positively against fault currents, the force at the maximum extreme of the control range is correspondingly increased. To obviate the need for stronger parts and more positive latching means, the maximum value at which the breaker must operate satisfactorily under no load conditions is decreased to 105 volts.

I have discovered that I can secure in the same breaker a blow-closed action which is effective to drive the contacts into full engagement assisting the closing mechanism until the contacts are latched; and I utilize the latching of the contacts to transfer the same electromagnetic forces into blow-open action. As a result when I close the contacts of my circuit breaker against a fault, at the instant of engagement of the contacts but before latched closed is obtained, the resultant magnetic forces are in a direction which assists the closing mechanism to drive the contacts closed until the contacts are latched closed and if thereupon the trip magnet is operated, the same magnetic forces drive the contacts open. I call these features "blow-open," "blow-closed."

In order to more fully understand the description which follows, terms used herein should be defined.

(a) Circuit breaker contacts are said to "blow-on" when they are so constructed that with the circuit breaker in a statically closed position, the magnetic forces due to short circuit currents tend to force the flexible parts of the contact in a direction to increase the contact pressure. The remaining parts of the circuit breaker are assumed to be made sufficiently rigid to withstand the forces involved with no appreciable distortion. "Blow-on" contacts may accelerate the opening of the circuit breaker if it is opened but not necessarily so.

(b) Circuit breaker contacts are said to "blow-off" when they are so constructed that with the circuit breaker in the closed position, the magnetic forces, due to a short circuit current, tend to force the flexible parts of the contact in a direction to decrease contact pressure or to force them to separate.

(c) Circuit breaker contacts are said to be "blow-open" when they are so constructed that the opening movement of the circuit breaker is accelerated by the magnetic forces set up by short circuit current passing through the circuit breaker.

(d) Circuit breaker contacts are said to be "blow-closed" when they are so constructed that the closing movement of the circuit breaker is not retarded but aided by the magnetic forces set up by short circuit current passing through the circuit breaker. The force required to close the breaker, with no current in the contact circuit, is thus greater than the force required to close the breaker when full short circuit current is flowing in the contact circuit.

It should be stressed here that the characteristic which is expressed as "blow-on" and which is incorporated in the prior art must be defined in static terms inasmuch as its principle is dependent upon a stationary point of pivot. During the full closing stroke of the switch arm, this point of pivot is not stationary and the magnetic stresses are in a direct opposition to the forces tending to close this pivot point to a position where it can be termed as fixed. This position of a fixed pivot occurs only when the mechanism advancing the pivot point is held so that the magnetic forces opposing the closing effort cannot be effective in determining the position of the pivot point. Latching of the pivot point in position is the normal means of obtaining this fixed position.

In the present invention, however, the "blow-closed" principle is a condition whereby the fault current magnetic stresses are effective in assisting the closing effort of the closing force before the circuit breaker contacts are latched in a closed position.

In the present illustration of my invention I provide two pivots for the movable contact arm. One of these pivots which I call the opening pivot is substantially fixed while the contact arm and a second pivot are moved to permit disengagement of the contacts. During this operation the magnetic forces act to blow the contacts open. The second pivot which I call the closing pivot is substantially fixed while the movable contact arm is rotated about it to secure positive engagement of the contacts.

This first or opening pivot point is so located on the switch arm that when the contact arm pivots thereon the magnetic stresses due to the flow of fault current is effective in producing components of force acting in the same direction along the entire length of the arm. By this means one single force is established in such a direction to force open the contact arm to its open position.

The second or closing pivot is so located on the switch arm that when the contact arm pivots thereon, two components of force, due to magnetic stresses, are established about this pivot. One component utilizes the force due to the magnetic stresses and the effective lever arm about the closing pivot point to force the switching arm in such a direction so as to close the circuit breaker contacts. This component of the force due to the magnetic stresses of the fault currents is designed to be greater than the other component due to the opposite end of the lever arm. The net result is a force tending to drive the contacts into engagement. This differential in resultant force is accomplished by a selection of the pivot point so that the effective lever arms are proportioned to give the blow-closed effect described.

The resulting magnetic forces from the closing pivot to the bend of the U-shaped current loop at one end of the arm are greater than the magnetic forces from the closing pivot to the bend of the U-shaped current loop at the contacts, and this produces a resultant magnetic force which drives the contacts into engagement. The closing pivot becomes substantially fixed when the latch is reset prior to the final closing operation of the contacts so as to enable the closing operation of the movable arm about this pivot. The opening pivot becomes fixed at the end of the closing stroke.

Summarizing the above, it will be observed by those skilled in the prior art that, in my invention, in the transition of contact engagement between the initial flow of fault current to the condition in which the circuit breaker is in the fully latched position with its corresponding adequate contact pressure, there has been evolved two distinct accomplishments in improving the performance of the circuit breaker in performing its proper function.

Accordingly, an object of my invention is to provide a novel circuit breaker in which the electro-magnetic forces set up by currents in the circuit being protected by the circuit breaker assist in driving the contacts to closing engagement when the circuit breaker is in the process of a closing operation.

A further object of my invention is to provide a novel circuit breaker in which the electro-magnetic forces set up by currents in the circuit being protected by the circuit breaker assist in driving the contacts to closing engagement and also assist in driving the contacts apart in response to a tripping operation.

Another object is to provide a circuit breaker that may be applied with time delay tripping at full rating and will function properly to close and latch and to open in the presence of fault current.

Another object is to provide a circuit breaker that may be closed manually at all current values above 12,000 amperes.

Another object is to provide a circuit breaker that may be used in a selective tripping system as shown in Patent No. 2,439,165.

Still another object of my invention is to provide a novel circuit breaker in which the movable arm is provided with at least two pivots, the first of which is substantially fixed during the closing of the circuit breaker arm while the second moves and the second is fixed while the first moves during tripping of the circuit breaker.

An important object of my present invention is to provide a snap acting blow-closed blow-open type of circuit breaker wherein the closing action serves to charge a closing spring which is released just as the moving contact approaches the stationary contact so that the moving contact is driven closed with a sharp impact owing to the sudden release of the compressed closing spring.

Another object of the present invention is the utilization of spring operated mechanism to shift the pivot of the contact arm so that the closing operation of the contact arm takes place about one pivot, the closing pivot, so positioned as to produce the blow-closed action, while the opening operation of the contact arm takes place about another pivot, the opening pivot, positioned to produce the blow-open action.

Another object of the present invention is the arrangement of the circuit breaker elements for blow-closed blow-open operation so that the center line distances between the pivots are relatively close and the operating mechanism is substantially reduced in size and complexity, thereby adapting the circuit breaker to construction in small sizes for use in low voltage circuit breaker applications.

The foregoing and many other objects of my invention will become apparent in the following description and drawings in which Figure 1 is a schematic view of my novel circuit breaker with the elements thereof in the open or tripped and collapsed position prior to reset of the elements.

Figure 6 is a schematic view of my novel circuit breaker showing the trip-free position of the elements thereof.

Figure 2:
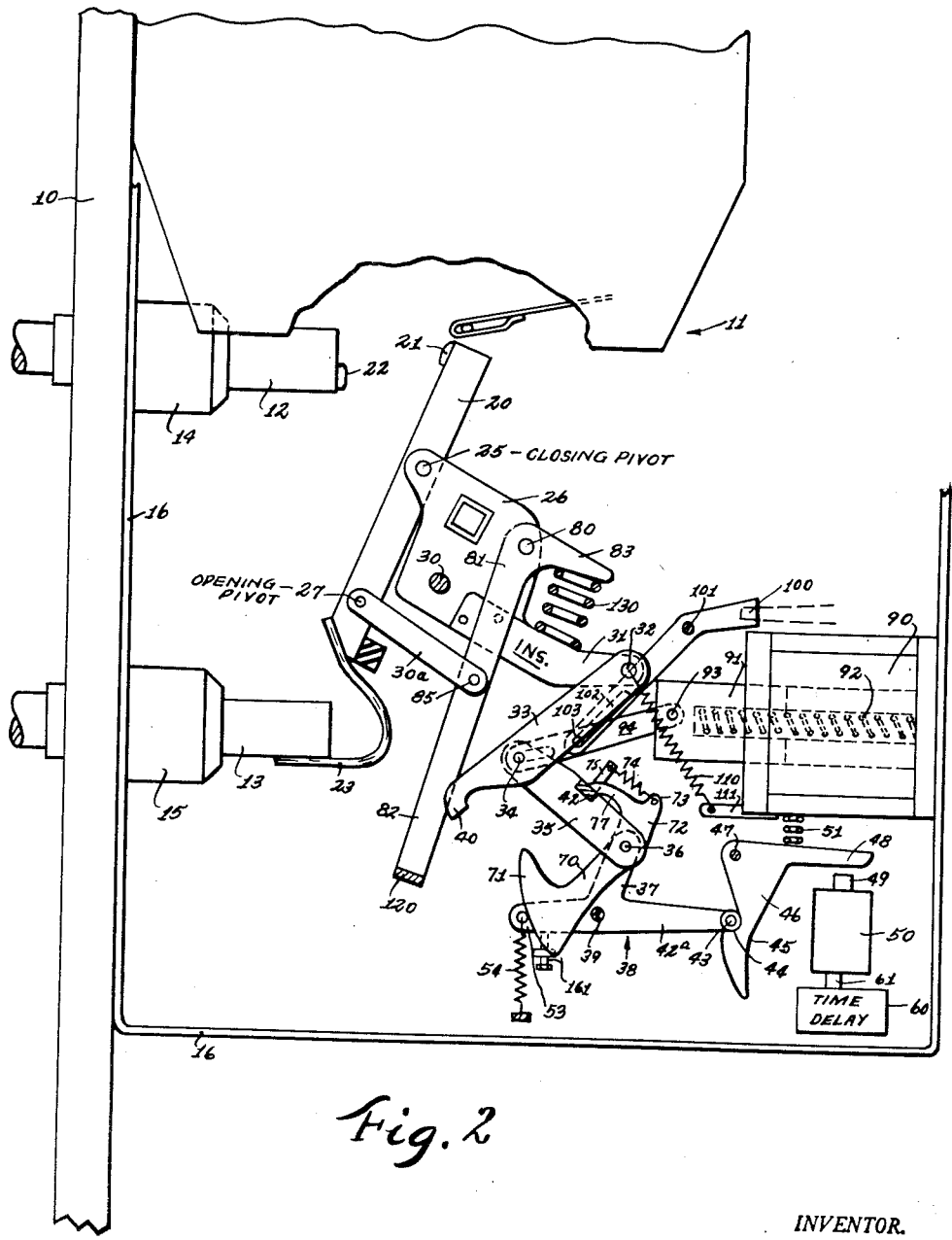
Figure 2 is a view corresponding to that of Figure 1 with the parts thereof in the fully open and reset position ready to be reclosed.

Referring first to Figure 2, my novel circuit breaker is here shown in the open position with all latches reset and ready to be closed once more.

The circuit breaker 11 is carried on the support base panel 10 on which the upper connection stud 12 and the lower connection stud 13 are mounted. The studs are supported in appropriate insulating bushings 14, 15 to isolate them electrically from the support bracket 16 for the operating mechanism.

Movable contact arm 20 is provided at its upper end with contact 21 engageable with stationary contact 22 on upper connection stud 12. The lower end of contact arm 20 is connected by pigtail 23 to lower connection stud 13.

Figure 4:
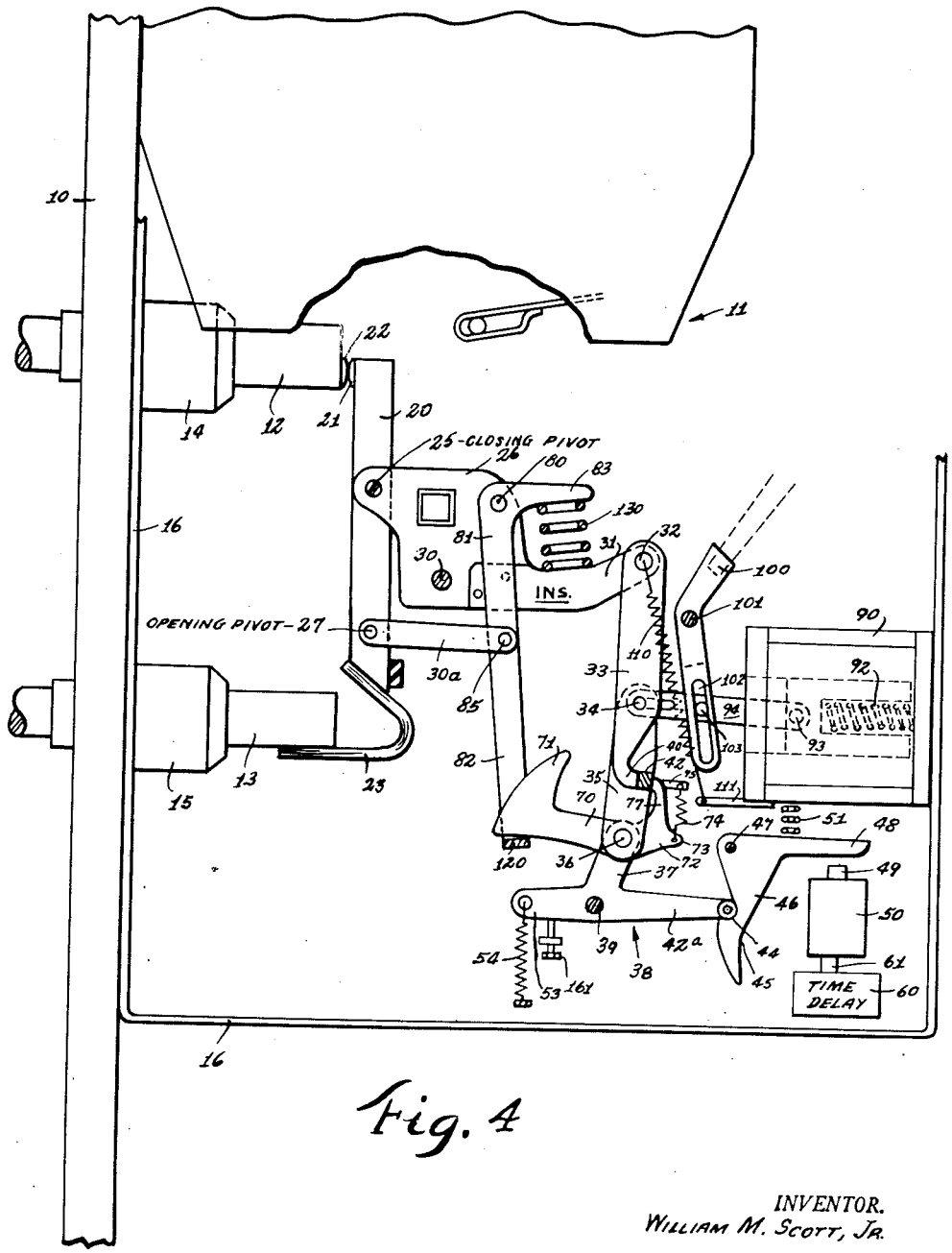
Figure 4 is a view showing my novel circuit breaker fully closed.

When the circuit breaker is in fully closed position as seen in Figure 4, a U-shaped current loop is formed from stud 12, contacts 22, 21, contact arm 20, pigtail 23 and lower connection stud 13.

Contact arm 20 has two pivots; a closing pivot 25 mounted on the arm member 26, and an opening pivot 27 also mounted on the member 30a. It will be noted that the opening pivot 27 is located so that a "blow-open" action occurs. The closing pivot 25 is located so that a blow-closed action occurs owing to the fact that the effective lever arm from the pivot 25 to the contact elements 21—22 is shorter than the effective lever arm from pivot 25 to the lower connection stud 13 so that the blow-open effect at the lower end of the contact arm more than counterbalances the blow-open effect at the upper end of the contact arm when the closing pivot 25 is fixed in position by the limitations of the toggle mechanism, thereby resulting in a net magnetic blow-closed effect for the upper end of the contact arm 20 when the contacts 21—22 first engage.

Crank 26 has an extension 31 to which is pivotally secured by the pin 32 the toggle link 33. The opposite end of link 33 is secured by pin 34 to link 35. Link 35 is secured at its opposite end to pivot 36 which during the closing operation of the circuit breaker is a stationary pivot.

Pivot 36 is, however, secured to the upper leg 37 of the three-legged latch lever 38, the latch lever being rotatably mounted on the fixed pivot 39. Links 33 and 35 form a toggle with pin 34 as the center pin of the toggle.

Link 33 has a stop extension 40 beyond the pin 34 which in the extended position of the toggle 33—35 shown in Figure 4 engages the stop 42 on link 35 to prevent the movement of the toggle 33—35 beyond a stable over-center position.

Latch lever 38 has a second extension 42A toward the front of the circuit breaker terminating in the latching roller 43 resting on the latching detent 44 of the leg 45 of the bell crank latch lever 46 which is rotatable on the pivot 47. The other leg 48 of the bell crank latching lever 46 extends over the armature 49 of a trip coil 50.

Spring 51 biases the bell crank latching lever 46 in a clockwise direction toward latching engagement. The armature 49 of the trip coil 50 is arranged so that when the trip coil 50 is energized, the armature 49 will move upwardly against the underside of leg 48 of latch lever 46 and rotate the latch lever 46 in a counterclockwise direction against the compression of spring 51 to move the latching detent 44 of the bell crank lever 46 out from under the roller 43 of extension 42 of latch lever 38.

It will be noted especially from Figure 4 that the toggle 33—35 in extended position is supported by the pin 36 on extension 37 of the latch lever 38.

Thus, when the circuit breaker is tripped by energization of trip coil 50 to allow latch lever 46 to rotate counterclockwise, the roller 43 of latch lever 38 will become disengaged from the latching detent 44.

Figure 1:
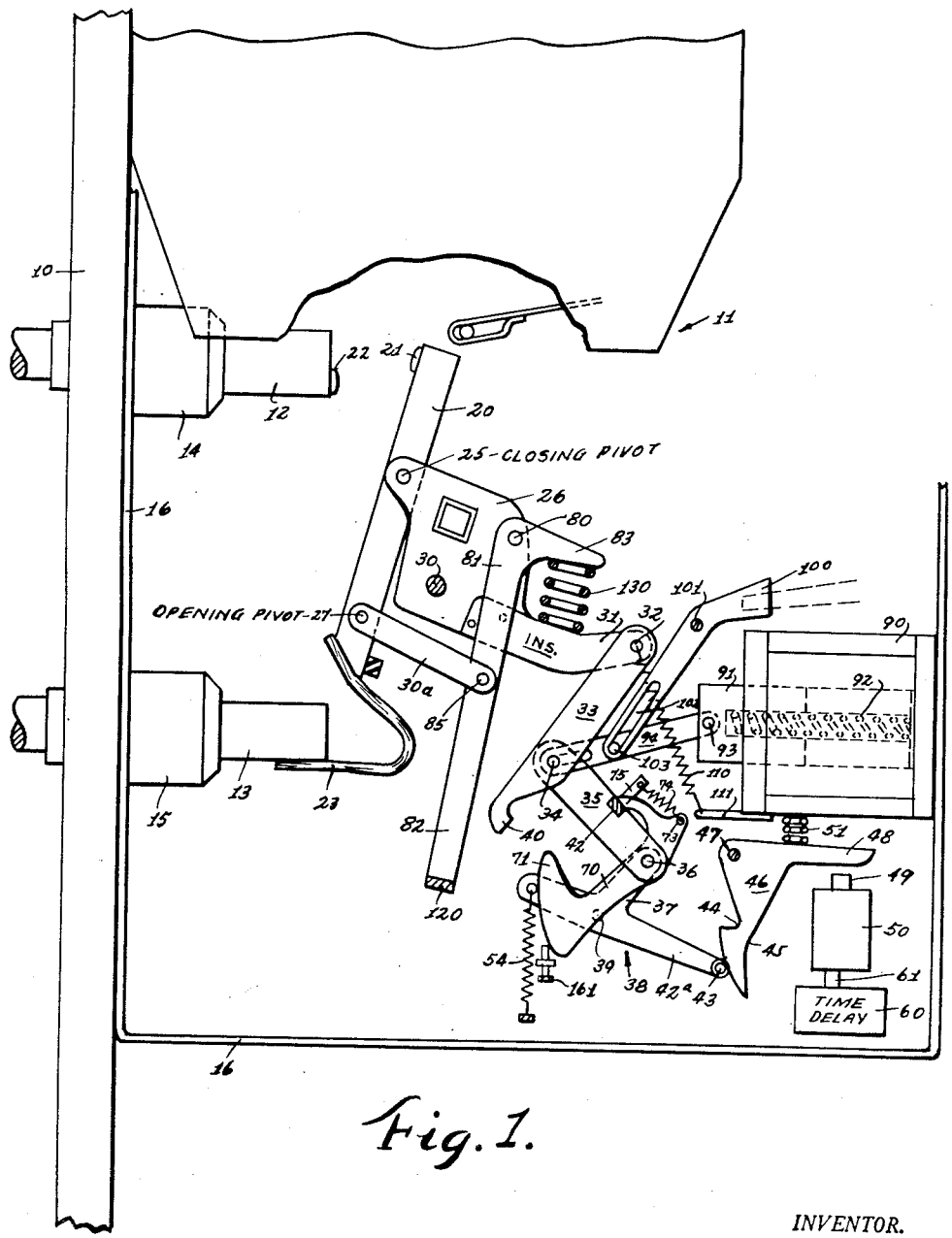

Since, as hereinafter described, the pin 36 actually supports the extended toggle 33—35 in position and is subjected to the opening forces and also since the pin 36 is located to the right of the pivot 39 of the latch lever 38, the latch lever 38 will then be rotated clockwise as shown in Figure 1 in a direction to pull the pin 36 at the end of toggle 33—35 clockwise.

This will cause the extended toggle 33—35 to move in a downward direction thereby allowing the movable contact structures 26 and 20 to move in an opening direction of the contacts 21, 22.

The third leg 53 of the three-legged latch lever 38 is provided with a tension spring 54 which will actually start the three-legged latching member 38 back to the original reset position where roller 43 rests on latching detent 44.

Spring 54 is simply a restoring spring and thus need exert only sufficient force between the operations of Figures 1 and 2 of the circuit breaker to restore the three-legged member 38 to its reset position of Figure 2.

The opening springs have far more power and thus will cause the tripping operation of Figure 1 to occur while the spring 54 is thereby extended. The integration of the "blow-open," "blow-closed" feature of a circuit breaker trip mechanism with sequential tripping systems or cascading systems in which at least certain circuit breakers in the system are subject to a time delay in their tripping operation has already been pointed out.

The armature 49 of the trip coil 50 may accordingly be time delayed in any appropriate well known manner by a time delay mechanism 60 connected by link 61 to the armature 49.

The time delay of mechanism 60 in this case is the so-called short time delay which will interpose a time delay of a few cycles even on short circuit current. This type of time delay has been described in Patent No. 2,439,165.

Pivot 36 on leg 37 of the three-legged latching arm 38 also carries the cam lever 70 rotatably mounted thereon, the rearward projection of the cam lever 70 terminating in the cam surface 71 and the forward projection 72 of cam lever 70 being provided with an ear 73 to which is connected the tension spring 74, the opposite end of which is connected to lug 75 of toggle link 35. Rearward projection 72 of cam lever 70 also has the stop lug 77 which engages the stop 42, the spring 74 pulling the cam lever 70 against the stop 42.

The operating crank 26 has pivotally mounted thereon on pivot pin 80 located forward and upward of the fixed pivot 30 the bell crank lever 81 having the downwardly directed long cam engaging leg 82 and the forwardly directed relatively short leg 83.

The approximate center of downwardly directed leg 82 is connected by pin 85 to link 30a, the opposite end of link 30a being connected to the pin 27 on contact arm 20.

Figure 3:
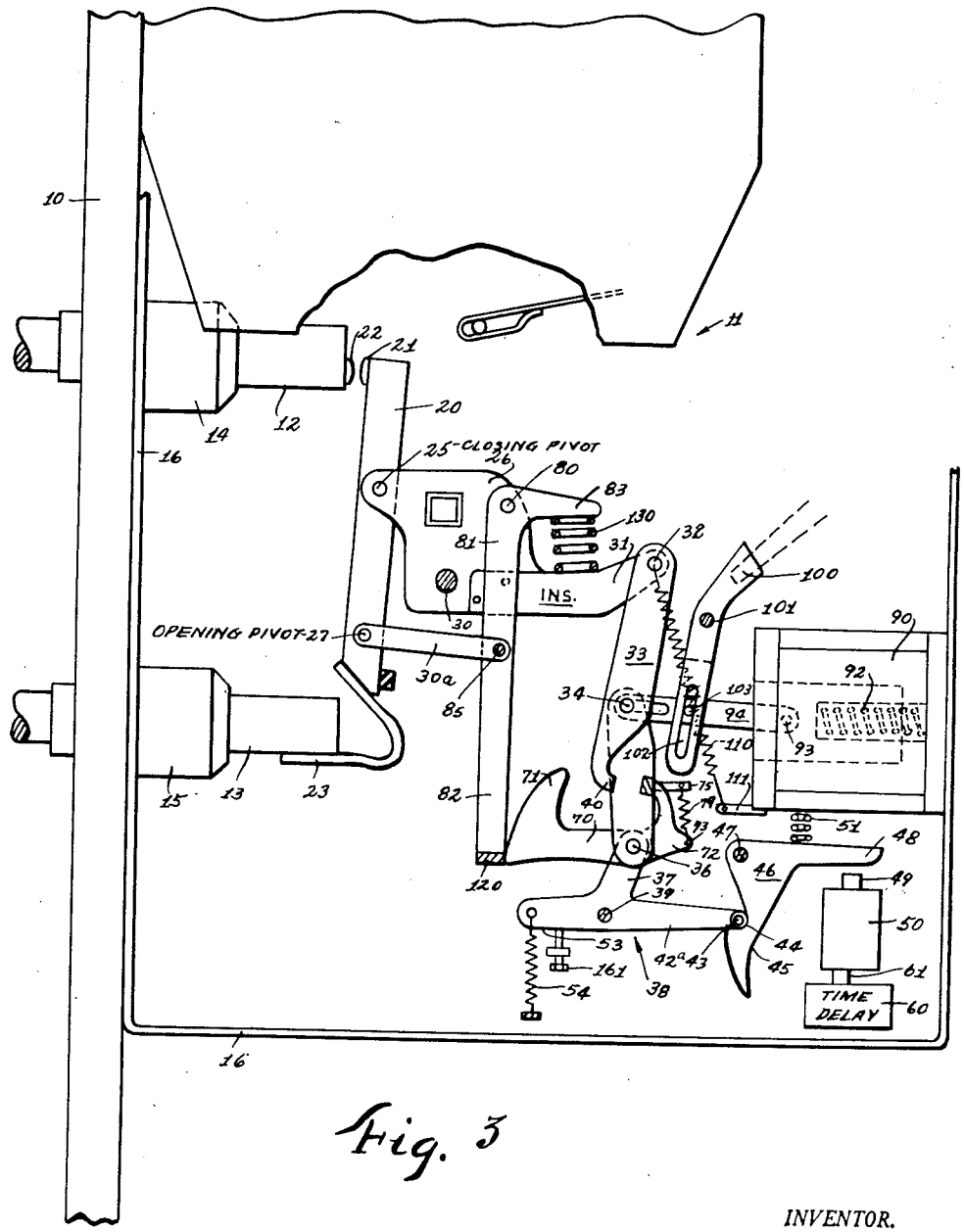
Figure 3 is a view showing my novel circuit breaker partially reclosed.

For a closing operation, the circuit breaker moves from the position of Figure 2 through the position of Figure 3 to the finally closed position of Figure 4.

In order to accomplish this operation, crank 26 must be rotated in a counterclockwise direction around the pivot 30. When the crank 26 thus rotates in a counterclockwise direction around the pivot 30, it will move the contact arm 20 so that the contact 21 approaches the stationary contact 22.

During the major portion of this movement the pivot of the contact arm 20 is actually about the pivot 30. However, this closing action around the pivot 30 occurs only during the preparatory closing stroke which moves the contact arm from the position of Figure 2 to the position of Figure 3.

The elements are so arranged that the final closing from the position of Figure 3 to the position of Figure 4 at the time when the magnetic forces can be set up by the initial engagement of the contacts occurs about the closing pivot 25.

Thus, the opening pivot 30 is actually the blow-open pivot during opening of the circuit breaker as herein described and also the closing pivot for the preparatory function of moving the contact arm 20 up to just short of the point where magnetic forces come into play.

At the point where magnetic blow-open forces may come into play, the closing pivot function shifts to the pivot 25 which, as previously described, is so positioned that the net resultant of the blow-open forces of the U-shaped loop will result in a closing force on the upper end of contact arm 20 where the movable contact 21 is located.

In order to accomplish the closing operation, therefore, it is necessary first to extend the toggle 33—35 to the position of Figure 3. For this purpose a closing solenoid coil 90 is provided having a plunger 91 which when the closing coil 90 is energized is pulled to the right against the force of the compression spring 92.

The left-hand end of closing armature 91 is connected by pin 93 to the closing link 94, the opposite end of which is connected to the center pin 34 of the toggle 33—35.

Energization of closing coil 90 will, therefore, result in drawing the armature 91 and the closing link 91 to the right, first to the partly closed position of Figure 3 and then to the fully closed position of Figure 4.

In addition, the closing operation may be effected by a closing handle 100 mounted on the fixed pivot 101 and rotatable in a counterclockwise direction from the open position of Figure 2 to the fully closed position of Figure 4 to close the circuit.

Closing arm 100 is provided at the left side of the pivot 101 with the slot 102 engaging the pin 103 fixed on the closing link 94 so that rotation of the closing handle 100 in a counterclockwise direction will also result in pulling the link 94 to the right and thereby closing the circuit breaker as above described in connection with the operation of the closing solenoid 90.

Tension spring 110 is connected between pin 32 on extension 31 of crank 26 and the stationary lug 111.

Tension spring 110 acts as the opening spring for the circuit breaker contact structure, functioning to rotate the crank member 26 in a clockwise direction upon the failure of toggle members 33—35 to maintain pivot point 32 in a fixed position.

Spring 92 serves only to allow plunger 91 to reset to the position shown in Figure 2 upon collapse of toggle members 33—35.

During the closing operation, the movement of link 94 to the right either by reason of the handle 100 or by reason of the closing coil 90 results in the extension of the toggle 33—35 and the rotation of crank 26 in a counterclockwise direction around the fixed pivot 30.

Contact arm 20 is thereby carried bodily toward the closed position during the initial stages of the closing movement. As the contact arm 20 begins to approach the closed position, the lower re-entrant end 120 of the downward extension 82 of bell crank member 81 mounted on the crank 26 engages the cam surface 71 of cam arm 70 effectively. The crank member 81 becomes substantially a stationary member although its upper pivot 80 moves slightly toward the left. This results in holding pin 85, link 30a and the pivot 27 substantially stationary during the intermediate stages of the closing movement as shown in Figure 3 and the pivot for the contact arm 20 during these intermediate stages of the closing movement is effectively the pivot 30, the contact arm 20, however, rotating toward the closed position at this time.

However, magnetic forces have not yet been set up since the circuit has not yet been closed owing to the fact that the contacts have not yet begun to engage.

At this time, owing to the fact that the arm 81 is substantially stationary while the crank member 26 is still rotating in a counterclockwise direction, the final closing spring 130 between the extension 83 of bell crank lever 81 and the upper surface of extension 31 of crank 26 is compressed from the position of Figure 2 to the position of Figure 3.

When the toggle 33—35 reaches the fully extended position of Figure 4, the stop extension 40 on link 33 strikes the stop 42 on link 35 and at the same time pushes out the stop lug 77 of cam lever 70, rotating the cam lever 70 clockwise from the position of Figure 3 to the position of Figure 4, thereby lifting the cam surface 71 of the cam lever 70 upwardly and out of the way of the re-entrant extension 120 of arm 81.

Spring 130 which has been compressed then rotates the cam engaging lever 81 counterclockwise around its pivot 80 with a snap action. This results in a strong snap acting pull through link 30a on the lower pivot 27 of the contact arm 20, pivot 27 at that time having translatory movement to the right and not acting as a pivot.

This thereby causes the contact arm 20 to rotate with a snap action about the closing pivot 25 to drive contact 21 into engagement with contact 22 with a corresponding snap action.

The circuit is closed at this time. Any magnetic forces set up by the current loop thus created at the initial moment of engagement of the contacts and before the final contact pressure is achieved on the contact arm 20 about the closing pivot 25 where, as previously described, the net balance of magnetic forces results in a force in a closing direction at the upper end of contact arm 20 carrying the contact 21.

When the circuit breaker trips, trip coil 40 through armature 49 rotates the latch lever 46 in a counterclockwise direction pulling the latching detent 44 thereof out from under the latch roller 43 of the three-legged latch arm 38.

This results in a clockwise rotation of pivot 36 of the three-legged latching member 38 around the fixed pivot 39. This rotation occurs because pivot 36 is at the end of toggle 33—35 subjected to the initial opening force of spring 110.

When the three-legged latch arm 38 falls out of engagement with the latch 46 to the position of Figure 1, then the compression spring 92 cooperates with spring 110, the spring 110 rotating the crank arm 26 around its fixed pivot 30.

The compression spring 92 by collapsing the toggle 33—35 aids this action materially. At the same time, since the compression spring 92 collapses the toggle pushing the knee pin 34 thereof to the left, it exerts a pull to the left or in a counterclockwise direction on pin 36 and thereby resets the three-legged latch member 48 on the latch 46, returning the elements to the position of Figure 2.

The opening force of the opening spring 110, as well as of the compression spring 92 acts on the contact arm 20 actually around the pivot 30 owing to the fact that the crank 26 is rotated around the pivot 30, but the pivots 25, 80, 85 and 27 form a parallelogram in which the movement of pivot 25 between the contact arm 20 and the crank 26 is fixed to a particular radius by the pivot 30.

Also, pivot 80 moves at a fixed radius around the pivot 30. Consequently, during the opening action, the parallelogram formed by pivots 25, 80, 85 and 27 moves substantially from the right angle condition of Figure 4 to the acute angle position of Figures 1 and 2, and the actual pivot of the contact arm 20 during opening, while it is located near the opening pivot 27, is actually located somewhere in space between pivots 27 and 30.

However, since both pivots 27 and 30 are closer to the lower connection stud 13 than they are to the upper connection stud 12, a full blow-off effect is possible.

By this means, therefore, a simplified mechanism is provided which will have a blow-closed action during closing, a blow-open action during opening and which thus makes possible a non-chattering snap acting closing spring for effecting the closing operation.

In Figures 1 to 4 the operation has been described for a single pole. It is obvious that the operation for two-pole, three-pole circuit breakers or other arrangement of poles may be readily achieved.

Figure 5:
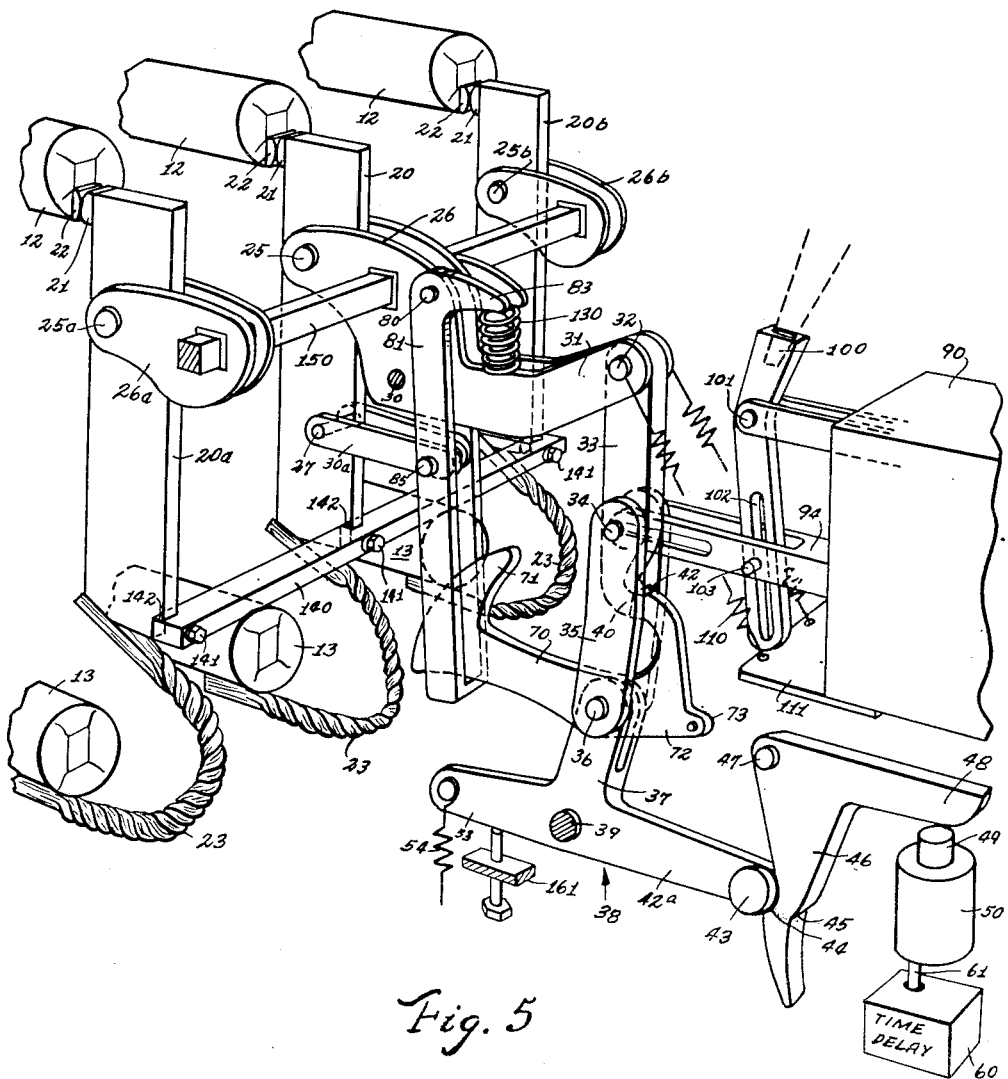
Figure 5 is a detailed fragmentary view in perspective of a three pole circuit breaker utilizing the principles of my invention.

This is shown in the schematic perspective of Figure 5 wherein the center pole including the contact arm 20 and crank 26 and all of the associated elements duplicate the elements shown in Figures 1 to 4.

Additional contact arms 20a and 20b are integrated for simultaneous operation with the contact arm 20 by having their lower ends connected by the insulating bar 140 secured in any suitable manner as by the bolts 141 in the recessed lower corners 142 of the contact arms 20, 20a and 20b.

The upper ends of the contact arms 20a and 20b are each provided with pins 25a and 25b pivotally connected to the links 26a and 26b. Links 26, 26a, and 26b are integrated by the tie bar 150 rigidly connected therebetween so that links 26a and 26b will have identical movement with the crank 26.

The tie bar 150 may be of insulating material, although it is preferred that the links 26a and 26b be made of insulating material and that they be connected with a steel tie bar 150.

It will thus be seen that the three-pole mechanism requires no further complication of any kind in the operating mechanism. It is only necessary to tie contact arms of the other poles together so that they will operate simultaneously and in an identical manner with the center pole contact arm 20. Any minute adjustment which may be necessary owing to slight differences between the three contact arms is taken up by the resilient mountings of either contacts 22 or 21 on the contact arm or connection studs in a manner well-known in the art.

The cam lever 70 is mounted as already described so that it will essentially follow the movements of link 35 of toggle 33—35. However, the utilization of the tension spring 74 to cause it to follow this movement rather than the utilization of a direct connection permits the cam lever 70 to rotate during the opening stroke in a clockwise direction away from the stop 42 in order to disengage itself from the extension 120 of the bell crank lever 81 and thereby permits the elements to move readily to the trip position of Figure 1 and then to the reset position of Figure 2.

The blow-closed, blow-open features are required only at the time of contact engagement since no current can flow at other positions of the arm during the closing of the stroke.

By this construction, it is possible to put the contact studs on a closer vertical center line and to design a smaller breaker as would be required for 600 volt applications.

In this construction also, the closing power and the trip force are communicated through a single link 33 instead of through two different points of application.

In addition to this, because of the spring 130 and its final closure of the breaker, it will be possible to supply hand-operated breakers with a quick make feature which is desirable for the safe operation of a circuit breaker when closing on a short circuit.

Thus, the closing force is applied essentially around pivot 25, while the opening force takes place substantially about the pivot 30.

A stop member 161 is provided for latch member 38 to ensure that during reset thereof from the position of Figure 1 to the position of Figure 2, it will not move counterclockwise beyond the reset position.

In Figure 6 the trip-free operation of my novel circuit breaker is shown.

Assuming the solenoid plunger 91 or the manual closing handle 100 are to be held in stationary position at the end of their normal closing stroke and there is fault current flowing in the circuit due to an existing short circuit condition, the circuit breaker contacts will be expected to relieve the fault current at any point in the closing stroke after the contacts are in engagement as permitted, of course, by the time delay 60.

This is initiated by the operation of the trip coil 50 rotating the latching member 46 in a counterclockwise direction. Coacting latch member 38 will be rotated in a clockwise direction due to opening forces of (a) the opening spring 112, (b) the contact pressure spring forces, and (c) the magnetic stresses of the fault current on the contact member 20.

Rotation of member 38 will allow the extended toggle elements 33—35 to be forced in a downward direction, being guided by the locus of pivot 36 about point 39. This action is different from the normal trip operation of the mechanism shown in Figure 1 in that the closing link 94 serves to hold the toggle elements 33—35 in their extended position.

The downward movements of this extended toggle 33—35 allow the contact member 20 to assume its fully opened position under influence of the opening spring 110. Therefore, a trip-free opening operation of the contacts 21—22 at any point in the closing stroke of either the solenoid plunger 91 or the manual closing handle 100 is obtained.

The operating characteristics of the blow-closed, blow-open type circuit breaker contact are essential to its proper functioning if applied to systems requiring deliberately introduced time delays in ranges of current values recognized as fault currents. The closing of prior circuit breakers either manually, electrically or by pneumatic means against high fault currents and with time delayed operation of overcurrent trip devices is hazardous to operating personnel and to the operating equipment. The present invention obviates this hazard.

The parts involved are unique in establishing a snap-acting pair of circuit breaker contacts. The spring operated mechanism is used to shift the pivots to obtain the operating characteristics. The simplicity of the motion required strongly recommends this type of mechanism for use on low voltage circuit breaker designs. By the same token, small circuit breaker designs may be evolved.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. In combination, a multipole circuit breaker, each pole having an individual movable arm, each carrying a movable contact thereon and individual fixed contacts cooperating with their associated movable contacts, a crank connection from each of said movable arms, a tie bar for connecting said cranks, a closing pivot for each of said movable arms, means for operating said movable arms about said closing pivot to effect engagement of said fixed and movable contacts, a crank pivot for one of said cranks, means for operating said movable arms about said crank pivot for effecting disengagement of said contacts, a common snap acting closing spring connected to said one crank for operating said movable arms about said closing pivot, a common latch for all the poles of said circuit breaker, means for rotating one of said cranks about said crank pivot and rotating thru said tie bar said other cranks to operate said movable arms toward contact engagement and simultaneously storing energy in said spring, means operative after a predetermined movement of said arms toward contact closing position for releasing the energy in said spring to simultaneously operate said movable arms about said closing pivot into contact engagements, means for biasing said contact arms to disengaged position, means responsive to fault currents for tripping said common latch to permit said biasing means to rotate said movable arms about said crank pivot to effect disengagement of said contacts, a second latch operative following engagement of said contacts for latching said contacts closed, and means operative following engagement of said contacts and effective only until said second latch operates for effecting a blow closed action on said movable arm.

2. In combination, a multipole circuit breaker, each pole having an individual movable arm, each carrying a movable contact thereon and individual fixed contacts cooperating with their associated movable contacts, a crank connection from each of said movable arms, a tie bar for connecting said cranks, a closing pivot for each of said movable arms, means for operating said movable arms about said closing pivot to effect engagement of said fixed and movable contacts, a crank pivot for one of said cranks, means for operating said movable arms about said crank pivot for effecting disengagement of said contacts, a common snap acting closing spring connected to said one crank for operating said movable arms about said closing pivot, a common latch for all the poles of said circuit breaker, means for rotating one of said cranks about said crank pivot and rotating thru said tie bar said other cranks to operate said movable arms toward contact engagement and simultaneously storing energy in said spring, means operative after a predetermined movement of said arms toward contact closing position for releasing the energy in said spring to simultaneously operate said movable arms about said closing pivot into contact engagements, means for biasing said contact arms to disengaged position, means responsive to fault currents for tripping said common latch to permit said biasing means to rotate said movable arms about said crank pivot to effect disengagement of said contacts, a second latch operative following engagement of said contacts for latching said contacts closed.

3. In combination, a multipole circuit breaker, each pole having an individual movable arm, each carrying a movable contact thereon and individual fixed contacts cooperating with their associated movable contacts, a crank connection from each of said movable arms, a tie bar for connecting said cranks, a closing pivot for each of said movable arms, means for operating said movable arms about said closing pivot to effect engagement of said fixed and movable contacts, a crank pivot for one of said cranks, means for operating said movable arms about said crank pivot for effecting disengagement of said contacts, a common snap acting closing spring connected to said one crank for operating said movable arms about said closing pivot, a common latch for all the poles of said circuit breaker, means for rotating one of said cranks about said crank pivot and rotating thru said tie bar said other cranks to operate said movable arms, toward contact engagement and simultaneously storing energy in said spring, means operative after a predetermined movement of said arms toward contact closing position for releasing the energy in said spring to simultaneously operate said movable arms about said closing pivot into contact engagements, means for biasing said contact arms to disengaged position, means responsive to fault currents for tripping said common latch to permit said biasing means to rotate said movable arms about said crank pivot to effect disengagement of said contacts.

4. In a circuit breaker, a movable arm having a movable contact thereon, a fixed contact engageable by said movable contact, a snap action closing spring, means for operating said movable arm toward contact closing position and for simultaneously storing energy in said spring, means operative when said arm has reached a predetermined position close to contact energizing position for releasing the energy in said spring, a connection from said spring to said arm for transferring the energy from said spring to said arm only after said arm has moved close to contact engagement for operating said arm with a snap action into closing position, an opening biasing means, a connection from said opening biasing means to said movable arm for operating said movable arm to opening position, means whereby said closing spring has no opposing effect on said opening biasing means a latch for maintaining said movable arm in contact engagement against the action of said biasing means, means for effecting a blow closed action on said movable arm only before said movable arm has been latched in contact engagement and means for effecting a blow open action on said movable arm while said movable arm is being moved to contact disengagement.

5. In combination, a multipole circuit breaker, each pole having an individual movable arm, each carrying a movable contact thereon and individual fixed contacts cooperating with their associated movable contacts, a crank connection from each of said movable arms, a tie bar for connecting said cranks, a closing pivot for each of said movable arms, means for operating said movable arms about said closing pivot to effect engagement of said fixed and movable contacts, a crank pivot for one of said cranks, means for operating said movable arms about said crank pivot for effecting disengagement of said contacts, a common snap acting closing spring connected to said one crank for operating said movable arms about said closing pivot, a common latch for said circuit breaker, means for rotating one of said cranks about said crank pivot and rotating thru said tie bar and said other cranks to operate said movable arms toward contact engagement and simultaneously storing energy in said spring, means operative after a predetermined movement of said arms toward contact closing position for releasing the energy in said spring to simultaneously operate said movable arms about said closing pivot into contact engagements, means for biasing said contact arms to disengaged position.

6. In combination, a multipole circuit breaker, each pole having an individual movable arm, each carrying a movable contact thereon and individual fixed contacts cooperating with their associated movable contacts, a crank connection from each of said movable arms, a tie bar for connecting said cranks, a closing pivot for each of said movable arms, means for operating said movable arms about said closing pivot to effect engagement of said fixed and movable contacts, a common snap acting closing spring connected to said one crank for operating said movable arms about said closing pivot, a common latch for all the poles of said circuit breaker, means for rotating one of said cranks about said crank pivot and rotating thru said tie bar said other cranks to operate said movable arms toward contact engagement and simultaneously storing energy in said spring, means operative after a predetermined movement of said arms toward contact closing position for releasing the energy in said spring to simultaneously operate said movable arms about said closing pivot into contact engagements, means for biasing said contact arms to disengaged position.

7. In combination, a multipole circuit breaker, each pole having an individual movable arm, each carrying a movable contact thereon and individual fixed contacts cooperating with their associated movable contacts, a crank connection from each of said movable arms, a tie bar for connecting said cranks, a closing pivot for each of said movable arms, means for operating said movable arms about said closing pivot to effect engagement of said fixed and movable contacts, a crank pivot for one of said cranks, means for operating said movable arms about said crank pivot for effecting disengagement of said contacts, a common snap acting closing spring connected to said one crank for operating said movable arms about said closing pivot, a common latch for all the poles of said circuit breaker, means for rotating one of said cranks about said crank pivot and rotating thru said tie bar said other cranks to operate said movable arms toward contact engagement and simultaneously storing energy in said spring, means operative after a predetermined movement of said arms toward contact closing position for releasing the energy in said spring to simultaneously operate said movable arms about said closing pivot into contact, engagements, means for biasing said contact arms to disengaged position, means responsive to fault currents for tripping said common latch to permit said biasing means to rotate said movable arms about said crank pivot to effect disengagement of said contacts, a second latch operative following engagement of said contacts for latching said contacts closed, and means operative following engagement of said contacts and effective only until said second latch operates for effecting a blow closed action on said movable arm, and means operative following operation of said second latch for effecting a blow-open action on said movable arm.

8. In a circuit breaker, a movable arm having a movable contact thereon, a fixed contact engageable by said movable contact, a snap action closing spring, means for operating said movable arm toward contact closing position and for simultaneously storing energy in said spring, means operative when said arm has reached a predetermined position close to contact energizing position for releasing the energy in said spring, a connection from said spring to said arm for transferring the energy from said spring to said arm only after said arm has moved close to contact engagement for operating said arm with a snap action into closing position, an opening biasing means, a connection from said opening biasing means to said movable arm for operating said movable arm to opening position, means whereby said closing spring has no opposing effect on said opening biasing means, a latch for maintaining said movable arm in contact engagement against the action of said biasing means, a first latch for said movable arm, means responsive to fault currents for operating said latch to permit said biasing means to operate said contacts to disengagement, a second latch operative following tight contact engagement of said contacts, means for applying a blow-closed action to said movable arm after contact engagement and before said second latch is operated and means for applying a blow-open action to said movable arm following tripping of said first latch in response to a fault current condition.

9. In a circuit breaker, a movable arm having a movable contact thereon, a fixed contact engageable by said movable contact, a snap action closing spring, means for operating said movable arm toward contact closing position and for simultaneously storing energy in said spring, means operative when said arm has reached a predetermined position close to contact energizing position for releasing the energy in said spring, a connection from said spring to said arm for transferring the energy from said spring to said arm operative after said arm has moved close to contact engagement for operating said arm with a snap action into closing position, an opening biasing means, a connection from said opening biasing means to said movable arm for operating said movable arm to opening position, means whereby said closing spring has no opposing effect on said opening biasing means, a latch for maintaining said movable arm in contact engagement against the action of said biasing means, a first latch for said movable arm, time delay means responsive to fault currents for operating said latch to permit said biasing means to operate said contacts to disengagement, a second trip free latch operative following tight contact engagement of said contacts, means for applying a blow closed action to said movable arm after contact engagement and before said second latch is operated and means for applying a blow-open action to said movable arm following tripping of said first latch in response to a fault current condtion.

References Cited in the file of this patent

UNITED STATES PATENTS

| Number | Name | Date |
|---|---|---|
| 1,950,162 | Casby | Mar. 6, 1934 |
| 1,999,410 | Graves, Jr., et al. | Apr. 30, 1935 |
| 2,036,284 | Lindstrom | Apr. 7, 1936 |
| 2,275,891 | Cox et al. | Mar. 10, 1942 |
| 2,329,003 | Seaman | Sept. 7, 1943 |
| 2,419,125 | Dorfman et al. | Apr. 15, 1947 |

FOREIGN PATENTS

| Number | Country | Date |
|---|---|---|
| 568,429 | Great Britain | Apr. 4, 1945 |